United States Patent [19]

Nablo et al.

[11] 4,100,311

[45] Jul. 11, 1978

[54] PROCESS FOR CURING OF ADHESIVES FOR FLOCKING AND TEXTURING ON HEAT-SENSITIVE SUBSTRATES, BY ELECTRON-BEAM RADIATION

[75] Inventors: Samuel V. Nablo, Lexington; Alfred D. Fussa, Needham Heights, both of Mass.

[73] Assignee: Energy Sciences Inc., Bedford, Mass.

[21] Appl. No.: 698,025

[22] Filed: Jun. 21, 1976

Related U.S. Application Data

[63] Continuation of Ser. No. 468,818, May 10, 1974, abandoned.

[51] Int. Cl.$^2$ .......................... B05D 1/14; B05D 1/16
[52] U.S. Cl. ......................................... 427/44; 156/72; 156/272; 156/279; 427/206; 428/90; 428/95; 428/96
[58] Field of Search ................ 156/72, 62.4, 272, 279, 156/330, 331; 428/90, 97, 95, 237, 96; 427/44, 35, 206

[56] References Cited

U.S. PATENT DOCUMENTS

| | | | |
|---|---|---|---|
| 2,668,133 | 2/1954 | Brophy et al. | 156/272 |
| 3,262,128 | 7/1966 | Morgan et al. | 428/474 X |
| 3,661,691 | 5/1972 | Slosberg | 156/72 X |
| 3,903,331 | 9/1975 | Klein | 428/90 X |

*Primary Examiner*—David Klein
*Assistant Examiner*—M. G. Wityshyn
*Attorney, Agent, or Firm*—Rines and Rines

[57] ABSTRACT

The disclosure herein is concerned with critical electron-beam radiation parameters and beam-passage rates and adjustments that have been found to enable high-speed curing of adhesives used to bond flock and similar materials to heat-sensitive substrates that otherwise inherently limit the degree of thermal curing that may be employed as by other means, and consequently limit the speed of curing.

6 Claims, No Drawings

PROCESS FOR CURING OF ADHESIVES FOR FLOCKING AND TEXTURING ON HEAT-SENSITIVE SUBSTRATES, BY ELECTRON-BEAM RADIATION

This is a continuation application of Ser. No. 468,818, filed May 10, 1974, now abandoned.

The present invention is concerned with processes for curing adhesives bonding flock and similar materials secured to an unsupported, or supported, heat-sensitive substrate that inherently limits the degree of thermal curing feasible, and consequently limits the possible speed of curing.

The curing of adhesives bonding flock, face fabrics or the like adhered to heat-sensitive substrates has heretofore had to be effected at relatively low speeds, say of the order of 10-20 meters per minute, more or less, primarily because of the limitation upon the degree of thermal energy that may be applied without deleteriously affecting the heatsensitive substrate. Additionally, because of such curing temperature restrictions with conventional adhesives cured by condensation polymerization, the line speed of curing articles passing by the curing region has heretofore been practically limited since the degree of cure is a product of time at a given temperature.

An object of the present invention, accordingly, is to provide a novel electron-beam curing process that obviates such prior-art difficulties and, to the contrary, enables high speed flock-and-adhesive curing without any deleterious effect upon heat-sensitive substrates carrying such flocking or texturing materials attached to their surfaces.

A further object is to provide a new and improved flocking and related curing process of more general applicability, as well; other and further objects being explained hereinafter and more fully delineated in the appended claims.

In summary, from one of its broad aspects the invention embraces a process for curing texturing material such as flock and its supporting adhesive, secured to a heat-sensitive substrate that inherently limits the degree of thermal curing that may be employed and consequently the speed of curing, that comprises, applying an electroncurable adhesive layer to a heat-sensitive substrate, flocking fiber material upon the adhesive layer, passing the assembly of substrate and adhesively secured flocking material past a predetermined region, directing electron beam energy at said predetermined region upon the flocking material and through the same upon the adhesive layer, adjusting the electron beam to produce an electron dose of the order of 2 megarads ±50%, of energy of the order of 150 keV ±30%, and with a line speed of passing the predetermined region preferably of the order of about 20 to 80 meters per minute, in order to cure the flocking adhesive without affecting the heat-sensitive substrate. At the 2 megarad treatment level, less than 5 calories/gm of energy are delivered to the adhesive. Assuming an adhesive specific heat of 0.3, temperature elevations of only 10°-15° C are expected during the curing process, with much lower figures for the underlying web which receives almost no energy directly, and typically has a thermal capacity much greater than that of the adhesive film.

The invention will now be described without the necessity for a drawing in view of the clear process steps involved, and the wellknown character of suitable apparatus, examples of and references to which are hereinafter given, critically adjusted and operated to provide the novel sequence of process steps herein taught.

Specifically, it has been discovered that, if an electron beam is produced, as an illustration, by apparatus of the type described in the U.S. Pat. Nos. 3,769,600 and 3,745,396, and is regulated to direct its energy at a predetermined region upon texturizing material such as fiber flock, and through the same upon an electron-beamcurable adhesive that is to secure the flock to a heat-sensitive substrate, with the electron dose limited to the order of 2 megarads ±50%, the electron energy confined to the order of 150 keV ±30%, and with a line speed of passing the predetermined region preferably of the order of 20-80 meters per minute, rapid and highly effective simultaneous curing of the adhesive and bonding of the flocking can be effected without in any noticeable way affecting the heat-sensitive substrate. This is particularly successful with electron window-to-article spacing of the order of about 2 cm ±20%.

There are several advantages implicit in the process herein described which make the configuration uniquely efficient. Most important of these is the use of an unscanned source of directed electron energy so that the electrons are directed orthogonally into the texturized surface, such as the flocked surface, with trajectories parallel to the fibre orientation. As a result the energy loss due to fibre absorption of the electron energy flux is minimized — a geometry not possible with alternate energy sources, such as those described, for example, in U.S. Pat. Nos. 3,013,154 and 3,660,217, wherein the combination of the oblique incidence of the electron on the permeable window, and the thick windows used, lead to very large scatter angles in the emerging electron distribution. A secondary advantage of the process is taught in U.S. Pat. No. 3,780,308 in which the high stopping powers of low energy electrons in the 100–150 keV region are utilized to speed up the curing efficiency at a given processor power level (where the efficiency is meant to define the transfer and chemical utilization of the electron kinetic energy absorbed in the adhesive film). Furthermore, for the 25-150 $\mu$ adhesive film thicknesses commonly used in the flocking industry (for 0.5-2.5 mm flock), it is only with the use of these low energy electrons that the penetration of the curing flux through the adhesive to the labile substrate can be controlled.

As a first example, an 8 mil heat-sensitive sheet vinyl substrate, knife-coated with a few mils thickness (about 4 mils) of Dow XD 7530.01 acrylic epoxy adhesive, upon which nylon flock fibers were electrostatically flocked in conventional fashion with 6 Denier X 1.25 mm (50 mil) fibers, was found to be successfully adhesive-and-flock cured with line pass rates of 60 meters per minute, with an Energy Sciences' "Electrocurtain ™" model CB 150, described, for example, by Nablo, S. V. et al, "Electron Beam Processor Technology", *Nonpolluting Coatings and Coating Processes*, 179–193, ed. J. L. Gardon and J. W. Prane, Plenum Press, New York, 1972. The apparatus was adjusted to produce a dose of 2 megarads with an electron energy of 150 keV. Parallel studies were done with the same system at line speeds of 30 meters per minute and a treatment level of 3 megarads. Flocking material thickness of the order of two to fifty times the adhesive layer thickness are thus curable and have been demonstrated at flock lengths of up to 4.5 mm. Similar results were also obtained with Hughson urethane adhesive RD- 2275-58 on the upper surface of a 5 mil thick vinyl wall covering, with pressure sensitive adhesive and release paper already applied to the rear or lower surface. In both of the above cited examples, the abrasion resistance and solvent resistance of the flock textured surface were at least factors of 3-5 better than that realized using conventional thermally cured epoxy or acrylic-latex emulsion adhesives.

As a further example, successful similar adhesive-flocking curing has been effected with the same apparatus and adjustments on temperature-sensitive styrene substrates, including styrene sheets up to 100 mils in thickness. Wood and paper substrates, and a variety of sheet and foam polyethylene and polyurethane as well as wallpaperlike paper-foil laminates, have also been employed to carry the electron-beam-cured adhesive-flocking coating, as have other types of electron-curable adhesives, such as acrylic-latexes and both aromatic and aliphatic urethanes, epoxy esters and other types of flocking materials such as rayon and polyesters, all with dose, energy and line speed adjustments within the before-stated ranges. With higher and lower doses, overcure (embrittlement) and undercure (poor bonding) have resulted, respectively, whereas with higher and lower energy levels overdose of the labile substrate and undercure of the adhesive have respectively been found.

As an additional example of the texturing application, cotton and stranded nylon yarn or core substrates have been coated with urethane and acrylic epoxy adhesives, and flocked with 1 mm nylon flock by conventional dc electrostatic flocking apparatus. The flocked adhesive was then cured in a single pass by the said "Electrocurtain TM" processor at a dose of about 2 megarads with 150 keV, and at a line speed of about 60 meters per minute. Treatment was unilateral from the processor, with full cure about the periphery of the core yarn accomplished by electrons back-scattered from the tray surface over which the yarn was strung, below the electron beam window of the processor.

Clearly other types of finishes and textures than flocked particles, such as spun filaments and the like, may be similarly adhered to thermally sensitive substrates and further modifications will also occur to those skilled in this art, all such being considered to fall within the spirit and scope of the invention as defined in the appended claims.

What is claimed is:

1. A process for curing the adhesive used to hold flock fiber texturing material and the like to a heat-sensitive substrate selected from the group consisting of temperature-sensitive plastics, natural fibers, wood, paper and paper-foil laminates that inherently limits the degree of thermal curing that may be employed and consequently the speed of curing, that comprises, applying an electron-curable adhesive layer of a thickness of the order of a few mils to a heatsensitive substrate, attaching a layer of said texturing material to the adhesive layer with the fibers substantially perpendicular to the layer and with the texturing material layer being of a thickness two to fifty times that of the adhesive layer, passing the assembly of substrate and adhesively secured material transversely past a predetermined elongated region extending over the coextensive width of the substrate, the adhesive layer, and the texturing material, directing unscanned electron curtain beam energy at said predetermined region upon the material at said region simultaneously throughout said region in a direction substantially parallel to the fibers throughout said region, and through the material and upon the adhesive layer substantially perpendicularly thereto throughout said region, adjusting the electron beam to produce an electron dose of the order of 2 megarads ±50% delivered to said adhesive layer throughout said region, of energy of the order of 150 keV ±30% throughout said region, and with a line speed of passing the predetermined region of the order of about 20-80 meters per minute, in order to cure the adhesive without affecting the heat-sensitive substrate.

2. A process as claimed in claim 1 and in which said adhesive is selected from the group consisting of acrylic epoxy, epoxy esters, acrylic latex and urethanes.

3. A process as claimed in claim 1 and in which said flock fibers are selected from the group consisting of nylon flock, rayon flock, polyester flock or combinations thereof.

4. A process as claimed in claim 1 and in which said substrate is in sheet form.

5. A process as claimed in claim 1 and in which said substrate is in yarn form.

6. A process as claimed in claim 1 and in which said substrate is a three dimensional surface.

* * * * *